United States Patent Office 3,428,337
Patented Feb. 18, 1969

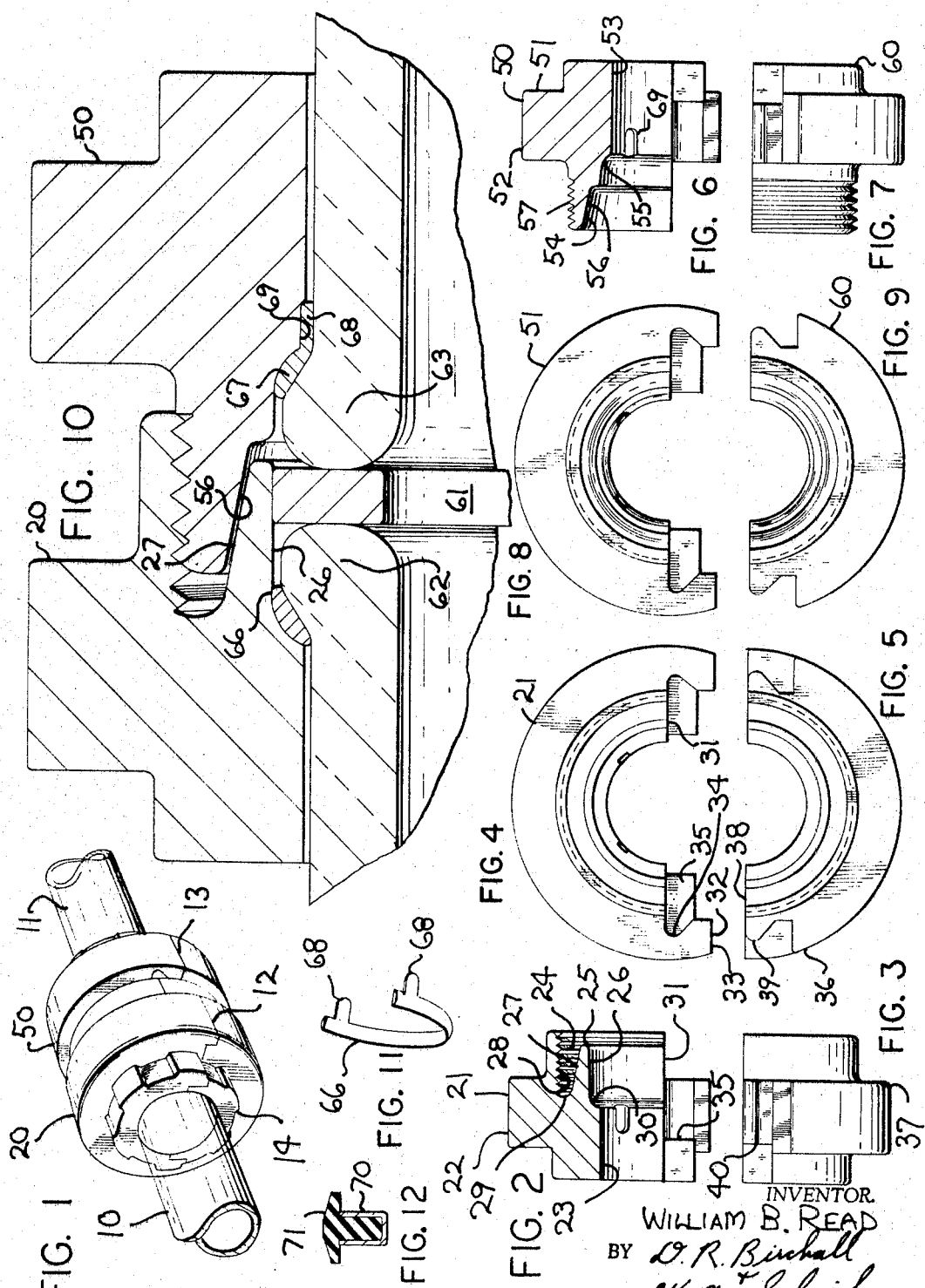

3,428,337
PIPE COUPLING
William B. Read, Sylvania, Ohio, assignor to Owens-Illinois, Inc., a corporation of Ohio
Filed Sept. 9, 1966, Ser. No. 578,384
U.S. Cl. 285—18                                5 Claims
Int. Cl. F16l 49/00, 21/4, 21/08

ABSTRACT OF THE DISCLOSURE

A pipe coupling for securely interlocking circumferentially enlarged flange-ended pipe sections having relatively fragile flanged ends, in non-contacting, end-to-end, non-leaking, intercommunicating relationship by means of constructing said pipe coupling with a pair of radially sectionalized annular collars, or rings, the sections of each of which are structurally designed to mutually interlock in snugly nesting and confining relationship around the flanged end of one each of the pipe sections to be so interlocked. The collars are also constructed to mutually interlock in such a manner that when individually sectionally interlocked, they will telescopically interconnect and preclude separation of the respective sections and at the same time bias the confined flanged ends of the pipe sections, at a circumferential location proximate the base or juncture thereof with the body of the pipe sections, axially towards each other and into annular sealing end contact or abutment with an annular sealing gasket positioned intermediate the flanged ends prior to telescopically interconnecting the collars.

---

This invention relates to pipe joints and, more particularly, the invention relates to a coupling for joining together axially aligned lengths of glass pipe.

During the installation of structural pipe such as glass pipe utilized in chemical installations, it is often necessary to couple together in end-to-end relationship two abutting lengths of pipe with little or no maneuverability on the part of the pipe sections that are being coupled. Also when an existing section of glass pipe becomes broken, the replacement section of pipe will be necessity fit in between the already in situ sections of pipe that form the particular pipe system. In either of such instances, it is desirable to have a pipe coupling assembly that can be positioned around the joint without first having to slip the coupling over one end of pipe and work it way from the joint in order to install the adjacent length of pipe. In addition to the foregoing considerations, it is also desirable with flanged-end pipe sections to have a pipe coupling that will apply the coupling load on the back side of the flange and as near as possible to the base of the flange. Modern-day prior art devices customarily require that the coupling possess a passage therein large enough to pass over the entire flange on the end of the pipe. Additional semi-circular blocks, or other means, are then usually inserted between the inside of the coupling and the exterior of the glass pipe in the manner of bushings and in order to permit the coupling assembly to bear directly against the back side of the flange.

Therefore, it is apparent that if the pipe coupling is comprised of semi-circular sections, the sections may be placed, one from each side, over the joint to effect a structural connection between the sections of glass pipe. By placing the coupling parts radially and axially inward and behind the flange of the pipe, the coupling can fit quite closely around the exterior of the pipe without the necessity of additional blocks, bushings or other ancillary parts. In this manner, the bearing force accompanying tightening interconnection of the pipe coupling components will be primarily directed against the pipe flange in a circumferential location proximate to the face or juncture of the flanged ends with main body of the pipe sections thus minimizing the commonly bending stresses within the flanged-end glass structure.

The present invention is comprised essentially of semi-circular collar half sections. Two mating collar half sections are clasped about and quite close to the exterior of the pipe and oriented with respect to each other so that their mating parts lock together to form what would be equivalent to a circular collar. The resultant circular collars, or rings contain complementary threads so that when cooperatively locked together in such manner that they united together all four of the collar half-sections become cannot be unintentionally or accidentally disengaged. In addition to locking the interlocking sections of the coupling together, the threaded engagement will properly align and force the opposed end walls of the coupled glass pipe sections into sealing abutment with an elastomeric type annular sealing gasket disposed intermediate the opposed end walls.

It is a primary object of this invention to provide a pipe coupling constructed to forcefully draw the flanges of a pair of flanged-end pipe sections axially toward each other and into non-leaking, firmly sealed, end-to-end intercommunication.

An additional object of the present invention is to provide a pipe coupling capable of accomplishing the foregoing objective by means comprised of semi-circular interlocking segments that will when coupled one to the other in threaded engagement form a composite pipe coupling capable of withstanding the stresses and internal pressure loads customarily encountered during and after assembly of a glass pipe installation.

A further object of this invention is to provide a pipe coupling capable of accomplishing the first-mentioned objective by means of being constructed to exert its axial coupling force at a location designed to minimize the impartation of bending stresses upon the pipe sections.

Another object of the instant invention is to provide a coupling and seal that will not obstruct the flow of a fluidized medium as it passes through axially aligned pipes connected by said coupling.

Another object of this invention is to provide a pipe coupling which is capable of accomplishing the foregoing objectives and which is also capable of being readily assembled and disassembled without lateral displacement of the pipe sections over which the coupling fits.

Other objects and advantages of this invention will become apparent when reference is made to the following written specification and claims when considered in conjunction with the accompanying drawings wherein:

FIG. 1 shows a perspective overall view of two pieces of pipe held together by an assembled pipe coupling.

FIG. 2 is a radial-sectional view depicting the interior structure and configuration of one of the sectors comprising the female portion of the pipe coupling.

FIG. 3 is a side view of the ring sector or section that interlocks with the ring sector or section of FIG. 2 in complementary fashion to form the female ring portion of the pipe coupling.

FIG. 4 is an end view of the female ring section of FIG. 2.

FIG. 5 is an end view of the female ring section of FIG. 3.

FIG. 6 is a cross-sectional view of one of the sectors, or half-sections, of the male ring portion of the coupling and depicting the interior configuration thereof.

FIG. 7 is a side view of the other male sector, or half-section of the male ring portion that interlocks with the ring section of FIG. 6.

FIG. 8 is an end view of the male ring section of FIG. 6.

FIG. 9 is an end view of the male ring section of FIG. 7.

FIG. 10 is an enlarged fragmentary cross-sectioned view of the pipe joint with the male and female ring portions of the pipe coupling locked in position.

FIG. 11 is a perspective view of a semi-circular cushioning ring that is placed between the ring sections and the pipe flange.

FIG. 12 is a cross-sectional view of an alternative sealing gasket.

Referring to the drawings, FIG. 1 shows a section of glass pipe 10 coupled to another axially aligned section of glass pipe 11. Glass pipes 10 and 11 are held in locked position by female and male rings 20 and 50, respectively. The longitudinally aligned joint between the ring sectors that comprise ring 20 can be seen at 12. In a similar manner the joint formed by the parts of ring 50 can be seen at 13. A wrenching surface 14 is shown and will be more fully described elsewhere.

FIG. 2 is a side view, partially sectioned, of the recess containing internally threaded female ring section 21. Section 21 contains an outer circumferential surface 22 that is cylindrical in form. However outer surface 22 can be, if desired, of other geometrical configuration such as would lend itself to the attachment of a torque producing tool. Section 21 contains an axially aligned central aperture or bore 23 that extends entirely through ring section 21. A portion of bore 23 is of enlarged diameter and by way of example in the drawings approximately one half of bore 23 is so enlarged. The enlarged portion of bore 23 is identified generally by numeral 24. Within enlarged bore 24 is an axially extending flange 25 that is attached at its cantilevered base to the solid section of ring 21 adjacent the small diameter of bore 23. The radially inward surface 26 of flange 25 is essentially cylindrical. Surface 26, while shown as cylindrical, could possibly be of tapered or frusto-conical configuration. The radially outward surface of flange 25 is preferably frusto-conical as shown at 27.

The enlarged bore 24 which is positioned radially outward from flange 25 extends in an axial direction a greater extent than does the tip of flange 25. The internal surface of enlarged bore 24 contains internal threads 28. The transitional section between the base of threads 28 and the base of flange 25 is formed with a radius as shown at 29. In a similar manner the radially inward base of flange 25 is also formed with a radius as shown at 30.

Ring section 21 and the cross-sectional geometry, above described and shown in cross hatching in FIG. 2, continues circumferentially around the longitudinal axis for 180° and is thus terminated at plane 31. While 180° for the arcuate extent of ring section 21 has been shown, it is conceivable that other arcuate extents either more or less than 180° could be utilized without departing from the operability or scope of the present invention.

Now alluding to FIG. 4, it can be seen that the outermost extent of ring 21 extends circumferentially beyond the 180° plane 31 thus forming lip 32. Lip 32 is terminated in its arcuate or circumferential extent by end 33 which is essentially parallel to plane 31. The radial inward surface of lip 32 contains a recess 34 of curved configuration. In the axial extent, recess 34 is open at one end and is closed at the other end by backstop 35. FIG. 2 also shows backstop 35.

FIG. 3 has an overall cross-section for all practical purposes identical to the cross-section as shown and previously described in FIG. 2 relative to ring section 21. The outer surface 36 of ring section 37, as can be best seen in FIG. 5, does not extend through 180° of arcuate travel, however the inner surface 38 does extend essentially 180°. Inner surface 38 extends radially to form protuberance or lug 39 which is bulbous in configuration. Lug 39 does not extend for the entire axial extent of ring section 37. Lug 39 terminates at end 40 which when in final engagement abuts backstop 35 of ring section 21.

Thus it becomes evident from the foregoing description that ring sections 21 and 37 can be fitted over a cylindrical extent of tubing or rod so that internal bore 23 is in close proximity with the external surface of the tubing. By moving ring section 21 and ring section 37 axially toward each other, lug 39 of ring section 37 will engage recess 34 of ring section 21 thus forming an integral ring around the tubing, rod or pipe over which it is coupled. The internal threads 28 are so cast on ring sections 21 and 37 so that they have continuity when end 40 of lug 39 is in seated engagement with backstop 35 of ring section 21.

Ring 50 is comprised of two complementary parts identified as ring section 51, shown partly in cross-section in FIG. 6, and ring section 60, shown in FIG. 7. Ring section 51 contains an outer surface 52 of cylindrical configuration, although, if desired, it can be equipped with an external wrenching surface. Passing along the longitudinal axis of ring 51 is a bore 53. Bore 53 is essentially the same diameter as bore 23 of ring 21, as shown in FIG. 2. Bore 53 also contains an enlarged bore 54 of generally frusto-conical configuration. Bore 53 converges at its radially inward extent with radiused section 55. The radially outward extent of bore 54 contains a tapered surface 56 that has a slope compatible with the tapered outer surface 27 of ring section 21. External threads 57 are placed on the external section of ring section 51. Threads 57 have a root diameter that insures engagement with the internal threads 28 of ring section 21.

FIG. 7 shows a complemental ring section 60 that is keyed into locking engagement with ring section 51 to form completed ring 50. The details of the interconnecting features between ring sections 51 and 60 are similar to the interconnecting features heretofore described with respect to ring sections 21 and 37.

FIGS. 8 and 9 show the circular configuration and locking features of ring sections 51 and 60.

FIG. 10 is an enlarged cross-sectional view of the pipe coupling in sealing engagement with the ends of two sections of glass pipe. While the pipe coupling of this invention has been primarily designed for glass pipe, it is within the intended scope of the invention to include pipes, tubes or rods of other materials. Rings 20 and 50 are moved axially toward each other after they have been formed into complete rings by the interlocking features of their respective halves. The externally threaded end provided by the interlock sections 51 and 60 of ring 50 will engage the internal threads provided by the interlock sections 21 and 37 of ring 20 thus securely uniting the respective sections of the rings. Axial disengagement between the parts of rings 20 and 50 is prevented in almost all instances by the threaded engagement between the rings. Additionally, the seating of the rings against the back side of the flanges of the pipes prevent axial movement of one part of the coupling with respect to the remainder of cupling parts. Before rings 20 and 50 are brought together, a sealing gasket 61 is positioned between the flanged ends 62 and 63 of glass pipes 10 and 11. The exterior peripheral surface of sealing gasket 61 is indexed against the internal surface 26 of flange 25 of ring 20. In this manner gasket 61 cannot be dislodged laterally as rings 20 and 50 are coupled together. Concentric positioning of sealing gasket 61 is important not only from the standpoint of achieving a good seal but also from the standpoint of producing the maximum possible clearance through the joint. Moreover the said sealing gasket may have an alternative cross-section in the form of a T as shown in FIG. 12 which would provide a wide sealing surface. A flanged Teflon gasket carrier 70 contains a rubber sealing member 71 that has extended flanges thus providing a positive seal under practically all loading conditions. When fluid food products are carried by the glass pipe system, it is important that gasket 61 does not protrude radially inward and thus produce a hard to clean area. Prior to the application of split rings 20 and 50, seating cushions 66 and 67 are positioned over and behind the bulbous ends 62 and 63 of glass pipes, 10 and 11. As rings 20 and 50 are drawn together, radiused surfaces 30 and 55 will engage seating cushions 66 and 67 thus forcing them into contact with the back side of the bulbous pipe ends 62 and 63. Continued threaded tightening of rings 20 and 50 will draw ends 62 and 63 into seating abutment with gasket 61 interdisposed therebetween.

FIG. 11 shows a perspective view of the semi-circular seating cushion 66 which is structurally identical to cushion 67. Cushion 66 is equipped with two small tabs 68. Tabs 68 index into cut-outs 69, as shown in FIGS. 6 and 10. In this manner, cushions 66 are held in position along with segments of rings 20 and 50. Cushion 66 can be of a material such as Teflon and is of particular value when it is used in conjunction with a flange that has been hot formed on a glass pipe during field installation. As rings 20 and 50 are brought together, their radiused surfaces 30 and 55 will first contact the outwardly protruding high spots on the flange and cushions 66 and 67 will prevent such high spots from becoming points of high stress concentration in the completely tightened pipe joint. As rings 20 and 50 reach the maximum extent of their threaded engagement, surface 56 of ring 50 will almost contact outer surface 27 of flange 25 of ring 20. It can be readily seen that with an extension of the threads on rings 20 and 50 and by the proper selection of thickness of sealing gasket 61, the two above-mentioned tapered surfaces could provide a friction interlock that would force the threads of rings 20 and 50 together thus preventing inadvertent loosening or leaking of the sealed joint.

The foregoing pipe coupling provides a quick and convenient way to effect a connection between two axially aligned glass pipes. Additionally, the need for excessive work room is eliminated and the coupling can be made in a minimum of lapsed time. Moreover, the parts that comprise the sealing rings are held to a minimum and are so designed for ready manufacture as molded products.

While certain representative embodiments and details have been shown for the purpose of illustrating the invention, it will be apparent to those skilled in this art that various changes and modifications may be made therein without departing from the spirit or scope of the invention.

What is claimed is:
1. In a joint between two sections of axially aligned pipe having flanged ends, the combination of:
   a first ring coupler comprising a first pair of ring sectors of semi-circular configuration fitting around the exterior of one of said sections of pipe and together forming axially extending, concentric, annular inner and outer flanges, said outer flange being concentrically threaded on the interior thereof and said inner flange being spaced radially inward from said outer flange,
   one of said first pair of ring sectors defining recesses at the ends of its arcuate extent and the other of said first pair of ring sectors having lugs at the ends of its arcuate extent axially engaging said recesses and locking said first pair of ring sectors together against relative radial separation;
   a second ring coupler comprising a second pair of ring sectors of semi-circular configuration fitting around the exterior of the other one of said pipe sections and together forming an axially extending, concentric, exteriorly threaded flange threadably engaging said interiorly threaded outer flange on said first ring coupler;
   stops provided on one of the sectors of each pair of ring couplers positioning same so that the threaded portions of each pair of ring sectors are in alignment with each other;
   sealing means positioned between and in sealing abutment with the flanged ends of said axially aligned pipes, said sealing means being contained within said inner flange on said first ring coupler and in concentric alignment with said flanged ends of said pipe sections;
   cushioning members positioned around said pipe sections and biased by and between said ring couplers and said flanged ends of said pipe sections;
   interdigitated tabs and recesses on said cushioning members and said ring sectors cooperating in tongue and groove relationship in holding said cushioning members in position in said ring sectors.

2. A pipe joint combination as claimed in claim 1 wherein wrenching means are incorporated over at least one external surface on said ring couplers.

3. A pipe joint combination as claimed in claim 1 wherein the radially inward surface of said inner axially extending flange of said first ring coupler is of cylindrical configuration.

4. A pipe joint combination as claimed in claim 1 wherein the radially outward surface of said inner axially extending flange of said first ring coupler is of frusto-conical configuration so that the radial extent of the exterior of said inner flange at its base is greater than the radial extent of the exterior of said inner flange at its tip and wherein the radially inward surface of the axially extending flange of said second ring coupler is of frusto-conical configuration, said frusto-conical surfaces coacting together to induce a radially outward load upon the threaded engagement between said ring couplers thus forming a thread lock.

5. A pipe joint combination as claimed in claim 1 wherein said cushioning members are of semi-circular configuration.

References Cited
UNITED STATES PATENTS

| | | | |
|---|---|---|---|
| 370,168 | 9/1887 | Truxal | 85—33 X |
| 1,328,401 | 1/1920 | Savidge | 151—19 |
| 1,405,342 | 1/1922 | Shaffer | 85—33 |
| 1,782,484 | 11/1930 | Spencer et al. | 285—398 X |
| 2,688,500 | 9/1954 | Scott | 285—354 |
| 2,755,110 | 7/1956 | Jacobs | 285—423 X |
| 3,233,920 | 2/1966 | Ammann | 285—423 X |

FOREIGN PATENTS

| | | |
|---|---|---|
| 227,512 | 4/1960 | Australia. |
| 55,878 | 2/1939 | Denmark. |

CARL W. TOMLIN, *Primary Examiner.*

DAVE W. AROLA, *Assistant Examiner.*

U.S. Cl. X.R.

285—81, 331, 353, 364, 387; 151—19; 85—33

PO-1050
(5/69)

UNITED STATES PATENT OFFICE
CERTIFICATE OF CORRECTION

Patent No. 3,428,337      Dated February 18, 1969

Inventor(s) W. B. Read

It is certified that error appears in the above-identified patent and that said Letters Patent are hereby corrected as shown below:

Column 1, line 44 "be" should be --by--. Column 2, lines 13 and 14 should be reversed so that it reads --united together all four of the collar half-sections become cooperatively locked together in such manner that they--. Column 4, line 58 "cupling" should be --coupling--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents